United States Patent [19]

Insetta et al.

[11] Patent Number: 4,856,102
[45] Date of Patent: Aug. 8, 1989

[54] ADJUSTABLE MULITLAYERED CAPACITOR

[75] Inventors: Victor Insetta, Jacksonville, Fla.; Donald J. Davis, Jr., Rocky Point, N.Y.

[73] Assignee: American Technical Ceramics Corporation, Huntington Station, N.Y.

[21] Appl. No.: 286,348

[22] Filed: Dec. 19, 1988

[51] Int. Cl.$^4$ .............................................. H01G 4/34
[52] U.S. Cl. ..................................... 361/330; 361/321
[58] Field of Search ............... 361/306, 277, 321, 328, 361/330

[56] References Cited

U.S. PATENT DOCUMENTS

| | | | |
|---|---|---|---|
| 2,608,601 | 8/1952 | Boardman | 361/330 |
| 3,379,943 | 4/1968 | Breedlove | 361/330 |
| 3,448,355 | 6/1969 | Ahearn et al. | 361/306 |
| 3,898,541 | 8/1975 | Weller | 361/321 |
| 4,074,340 | 2/1978 | Leigh | 361/321 |
| 4,661,884 | 4/1987 | Seaman | 361/328 X |

*Primary Examiner*—Donald A. Griffin
*Attorney, Agent, or Firm*—Edward H. Loveman

[57] ABSTRACT

This capacitor has a monolithic dielectric block in which are laterally spaced electrode plates electrically connected to respective external terminal layers; on one or both sides of the block are conductive stripes of the same or different sizes which may be connected by jumper elements to the terminal layers. Electrodes in the block are closely spaced by thin dielectric spacers from the conductive stripes. Selective ones of the stripes may be connected to the terminal layers for adjusting the capacitance of the capacitor to different predetermined magnitudes.

10 Claims, 2 Drawing Sheets

ADJUSTABLE MULITLAYERED CAPACITOR

BACKGROUND OF THE INVENTION

1. Field of the Invention

This invention is concerned with the art of capacitors having multiple electrodes and more particularly concerns means for adjusting the capacitance values of capacitors employed in microcircuits.

2. Description of the Prior Art

Heretofore it has been very difficult to vary the capacitance of a fixed multilayer capacitor. One expedient has been to connect a plurality of similar capacitors together in various series and parallel combinations, leaving unchanged the capacitance value of each fixed capacitor. This expedient is not practical where space is limited or only one capacitor is available. Another expedient is to burn a hole in a capacitor by a laser beam or other means to burn away portions of the dielectric body of the capacitor and portions of the internally spaced electrodes. This method has several objections. Firstly, it is not possible to adjust precisely the desired change in capacitance value. Secondly, it is not possible to reverse the adjustment, once made. Thirdly, the invasive penetration of the dielectric body undesirably exposes the interior to ambient conditions which may not be conducive to stable operation of the capacitor. Fourthly, the method requires special, expensive equipment which is generally not available to the user of the capacitor in the field.

SUMMARY OF THE INVENTION

The above and other objectionable methods of adjusting prior fixed capacitors are avoided by the present invention. According to the invention, there is provided a plurality of spaced external electrode stripes on one or more sides of a capacitor having internal multiple spaced electrodes. The internal electrodes are connected to conductive spaced terminal layers on the capacitor. The external electrode stripes can be selectively connected by jumpers to one or both terminal layers for precisely adjusting the capacitance value of the capacitor. The capacitor can be calibrated and a table of capacitance values and corresponding external electrode connections, can be provided. The user will then have a method of precisely and definitely adjusting the capacitance value in a simple and effective way.

These and other objects and many of the attendant advantages of this invention will be readily appreciated as the same becomes better understood by reference to the following detailed description when considered in connection with the accompanying drawings in which:

Figure 1:
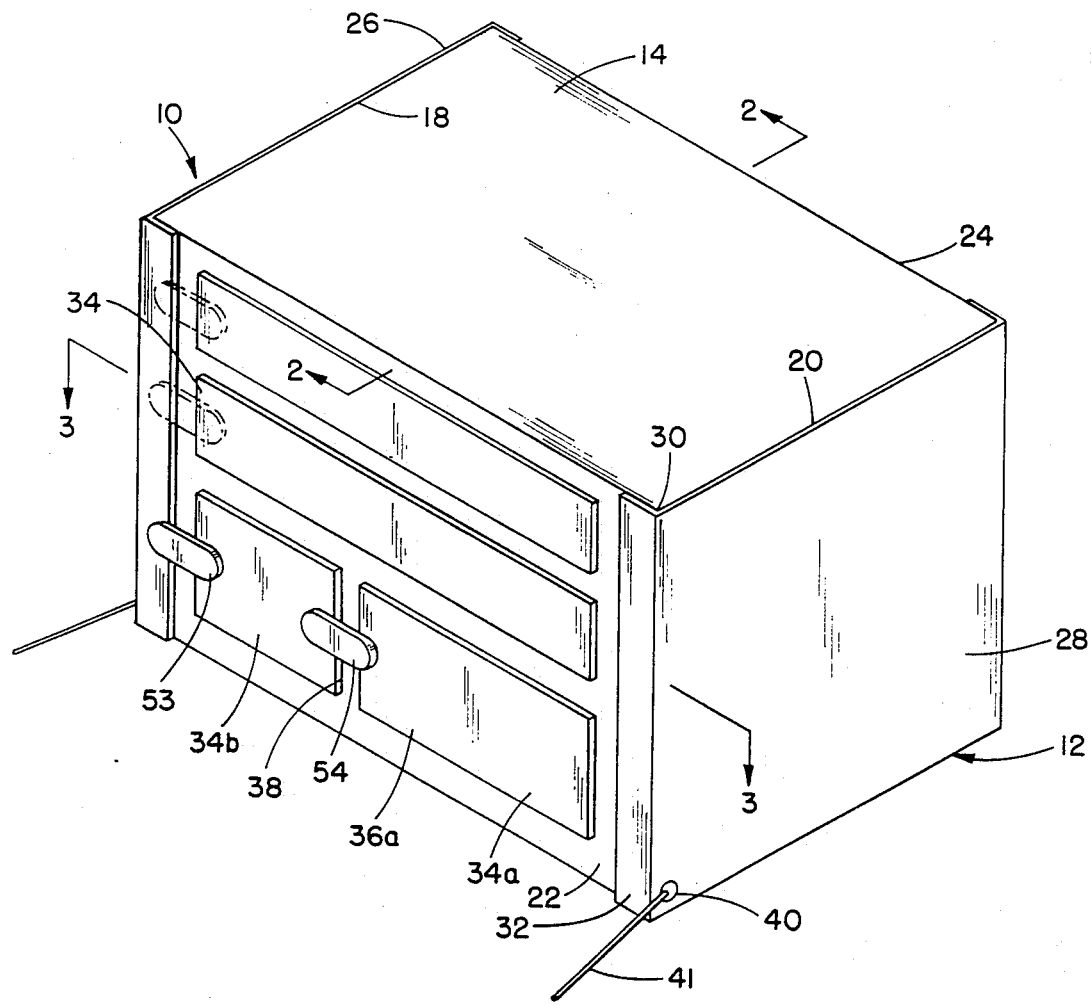
FIG. 1 is a perspective view of a adjustable capacitor embodying the invention.
Figure 2:
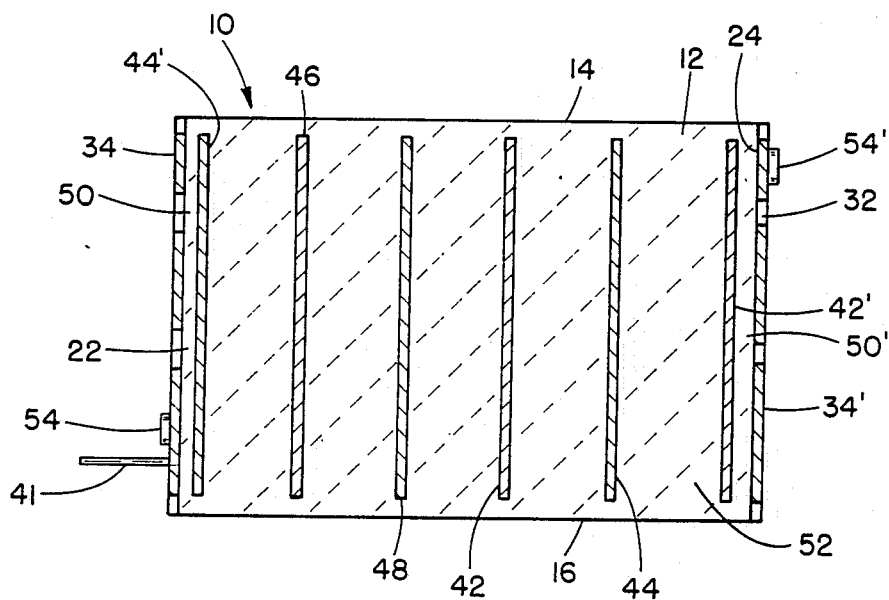
FIG. 2 is a vertical cross sectional view taken along line 2—2 of FIG. 1.
Figure 4:
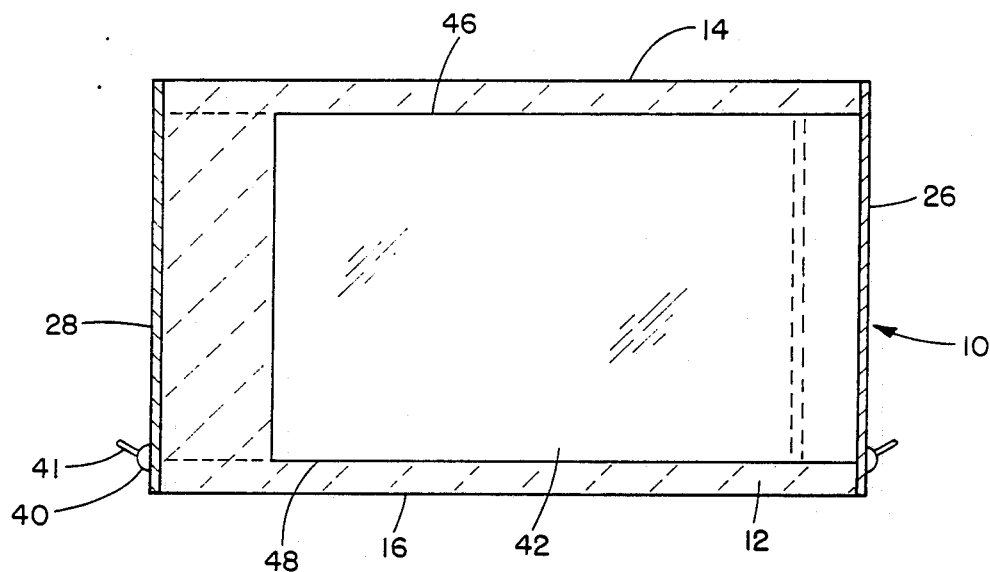
FIG. 4 is a vertical longitudinal sectional view taken along line 4—4 of FIG. 3.

Referring now to the drawings wherein like reference characters designate like or corresponding parts throughout, there is illustrated in FIGS. 1-4 a multiple layered monoliothic capacitor 10 having a solid rectangular body in the form of a block 12 with opposed flat upper and lower sides 14, 16; flat opposed end walls 18, 20; and flat opposed side walls 22, 24. The end walls 18, 20, are coated or covered with thin electrically conductive metal or metalized layers 26, 28. The layers 26, 28, may continue around corners 30 to form a narrow strip or band 32 at the adjacent end of the side walls 22 and/or 24. On the side wall 22 and/or on the side wall 24 are thin parallel rectangular electrically conductive bands or stripes 34, 34', made of metal or metalized material. The stripes 34, 34' may have different widths taken transversely between the sides 14, 16. The stripes 34, 34', are laterally spaced apart and terminate short distances away from the end walls 18, 20, and the end layers 26, 28, and the bands 32. If desired, one stripe may comprise two sections 34a, 34b, spaced slightly apart at their respective adjacent ends 38. One or more of other stripes 34 may be similarly divided into one or more sections. Secured to the opposed end layers 26,28, by solder joints 40, welds or otherwise, are terminal leads 41 for the capacitor 10.

The block 12 is formed of dilectric material which may be a sintered ceramic. Embedded in the block 12 are two sets of thin laterally spaced parallel electrically conductive plates 42, 44. The plates 42 extend up to and are in direct electrical contact with the electrically conductive terminal layer 26. Opposite ends of the plates 42 terminate short of and are spaced from the terminal layer 28. The plates 44 which alternate with the plates 42 extend up to and are in direct electrical contact with the electrically conductive layer 28. Opposite ends of the plates 44 terminate short of and are spaced from the end layer 26. Upper and lower edges 46, 48, of the rectangular plates 42, 44 are spaced slightly from the upper and the lower sides or walls 14, 16. The side plates 44' and 42' are very closely spaced from the side stripes 34, 34', being separated by respective very thin dielectric spacers 50, 50'. The thickness of the spacers 50, 50', is about one-tenth of the thickness of a block section or slab 52 which separates the other plates 42, 44. The narrow spacing between the plates 44', 42', and the stripes 34, 34', is an important feature of the invention which is explained further below. The plates 42, 44, constitute electrodes which determine the basic capacitance of the fixed capacitor 10.

Figure 3:
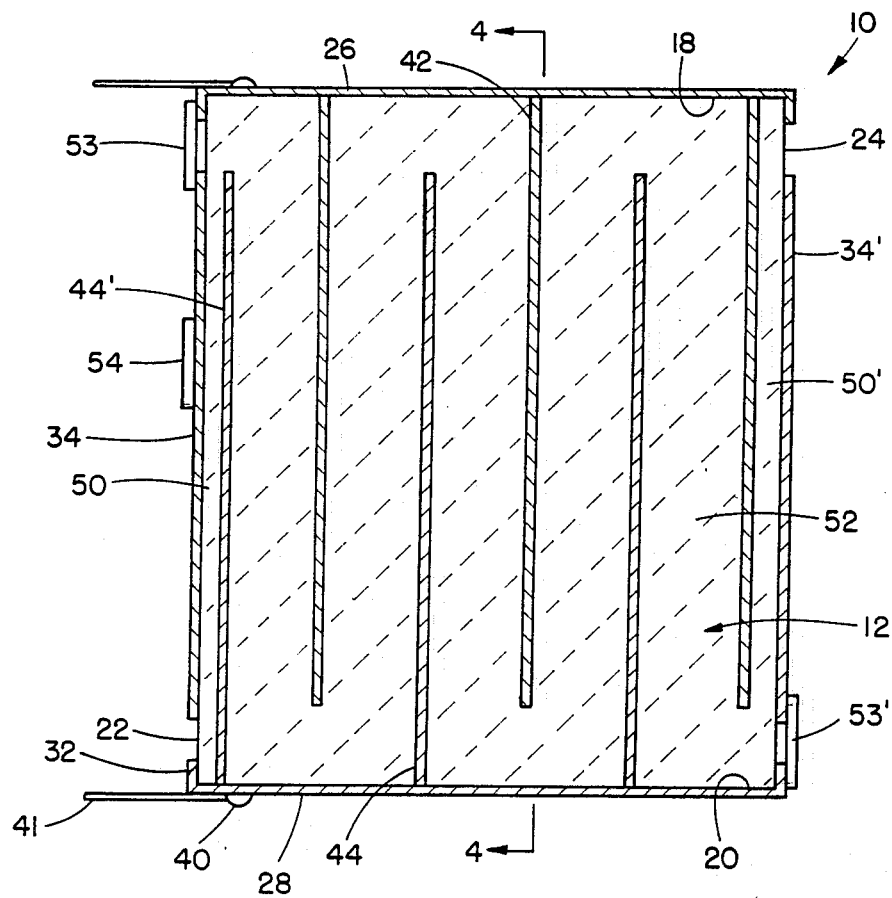
FIG. 3 is a horizontal cross sectional view taken along line 3—3 of FIG. 1.

Now according to the invention, the capacitance of the fixed capacitor 10 may be modified or adjusted by connecting selected ones or all of the stripes 34, 34', to the conductive bands 32 by a short conductive jumper element 53, 53', such as a wire, an electrically conductive tab, a drop of solder, etc. as shown in FIGS. 1 and 3. Similarly, the stripe section 34a may be connected to the stripe section 34b by an electrical conductor or jumper element 54, 54'. The connection of the jumper elements 53, 53', 54, and 54', to the stripes 34, 34', and the bands 32 have the effect of placing more electrodes in parallel with the electrode plates 42, 44, thereby increasing the capacitance of the capacitor 10. The stripes 34, 34', float free electrically with respect to the electrodes 42, 44, until the conductive jumper element 53, 53', 54, or 54', is applied. Due to the very close spacing of the side plates 42', 44', to the respective adjacent stripes 34', 34, a maximum capacitance adjustment is obtained, because the capacitance of a capacitor is increased by reducing the spacing between electrodes. The bands 32 facilitate attaching the jumper elements 53, 53', 54, 54', to the respective terminal layer 26, 28.

In one example of a practical capacitor, the thickness of the spacers 50, 50', may be 0.001 inches, whereas the thickness of the spacer slabs 52, may be 0.010 inches or ten times the thickness of the spacers 50, 50'. The total width of the block 12, taken traversely between the side walls 22, 24, may be 0.060 inches. The total length of the block 12, between the end walls 18,20, may be 0.080 inches; and the thickness between the sides 14, 16, may be 0.040 inches. The basic unadjusted capacitance of the capacitor 10 may be 10 pf. Thus it may be seen that the capacitor 10 is a component well adapted for insertion into microcircuits. The selective additions of one or more electrode stripes 34, 34', to the electrode assembly in the block 12, makes possible very small but predetermined adjustments of the capacitance of the capacitor 10; for example, adjustments ranging 1% to as much as 10. In the particular configuration of the stripes 34, 34', 34a, and 34b, illustrated in FIGS. 1, 2, and 3, eighteen or more combinations may be obtained by selective connections of the stripes together and to the bands 32 by the jumpers 53, 53', 54, and 54'. This contrasts markedly with the prior methods of capacitance adjustment where holes are burned in the bodies of the capacitors, to burn away portions of the embedded electrodes, to yield only one irreversibile capacitance adjustment.

It should be understood that the foregoing relates to only a preferred embodiment of the invention, which has been by way of example only, and that it is intended to cover all changes and modifications of the example of the invention herein chosen for the purposes of the disclosure, which do not constitute departures from the spirit and scope of the invention.

What is claimed is:

1. A capacitor having an adjustable capacitance comprising:
   a monolithic dielectric block having a plurality of external walls;
   spaced conductive terminal layers on said walls;
   laterally spaced electrodes embedded in said block and in direct electric circuit with different ones of said terminal layers;
   a plurality of conductive stripes spaced apart from each other and from said terminal layers on at least one of said walls, said stripes being disposed adjacent to and spaced from said electrodes in said block; and
   jumper elements for selectively and directly connecting said stripes to at least one of said terminal layers, for adjusting said capacitance.

2. A capacitor as defined in claim 1, wherein at least one of said terminal layers has a portion disposed on said block adjacent said stripes to minimize the lengths of said jumper elements required to connect said stripes with said one terminal layer, and to facilitate connection of said jumper elements to said one terminal layer.

3. A capacitor as defined in claim 1, wherein at least one of said laterally spaced electrodes in said block is very closely spaced from said stripes to maximize capacitance therebetween and thereby to maximize variation in said capacitance when connecting said jumper elements between said stripes and said terminal layers.

4. A capacitor as defined in claim 1, wherein said electrodes are disposed parallel to each other and spaced apart fixed distances to determine the capacitance thereof, at least one of said electrodes being very closely spaced from said stripes, to maximize said adjustable capacitance when said jumper elements are connected between said stripes and said terminal layers.

5. A capacitor as defined in claim 1, wherein said stripes respectively occupy areas of different sizes on said block for varying said adjustable capacitance by different predetermined amounts.

6. A capacitor ad defined in claim 1, wherein said laterally spaced electrodes are disposed parallel to each other and laterally spaced apart fixed distances, at least one of said electrodes being very closely spaced from said stripes to maximimize said adjustable capacitance when said jumper elements are connected between said stripes and said terminal layers; at least one of said terminal layers having a portion disposed on said wall of said block adjacent said stripes to minimize the lengths of said jumper elements connecting said stripes to said portion of said terminal layer and to facilitate connection thereof.

7. A capacitor as defined in claim 1, wherein said stripes are rectangular in shape and disposed in a coplanar array to facilitate connection of said stripes to each other and to said terminal layer by said jumper elements.

8. A capacitor having an adjustable capacitance comprising:
   a monolithic dielectric block having a plurality of external walls;
   spaced conductive terminal layers on said walls;
   laterally spaced electrodes embedded in said block and in direct electric circuit with different ones of said terminal layers;
   a plurality of conductive stripes spaced apart from each other and from said terminal layers on at least one of said walls; each of said stripes providing a predetermined fixed amount of capacitance to said capacitor when connected to one of said terminal layers; and
   at least one jumper element connecting at least one of said stripes to one of said terminal layers for varying said adjustable capacitance by a predetermined fixed amount.

9. A capacitor as defined in claim 8, further comprising other jumper elements connecting others of said stripes to said one terminal layer for varying said adjustable capacitance by other predetermined fixed amounts.

10. A capacitor as defined in claim 9, further comprising another plurality of conductive stripes on another of said walls and spaced apart from each other and from said terminal layers; at least one other jumper element electrically connecting at least one of said other stripes to another of said terminal layers, for varying said adjustable capacitance by still other predetermined fixed amounts.

* * * * *